(12) United States Patent
Berger et al.

(10) Patent No.: US 8,939,034 B2
(45) Date of Patent: Jan. 27, 2015

(54) FLOW MEASURING DEVICE

(75) Inventors: Andreas Berger, Hasel-Glashutten (DE); Pierre Ueberschlag, Saint-Louis (FR)

(73) Assignee: Endress + Hauser Flowtec AG, Reinach (CH)

( * ) Notice: Subject to any disclaimer, the term of this patent is extended or adjusted under 35 U.S.C. 154(b) by 36 days.

(21) Appl. No.: 13/996,075

(22) PCT Filed: Dec. 1, 2011

(86) PCT No.: PCT/EP2011/071467
§ 371 (c)(1),
(2), (4) Date: Jun. 20, 2013

(87) PCT Pub. No.: WO2012/084445
PCT Pub. Date: Jun. 28, 2012

(65) Prior Publication Data
US 2013/0269448 A1  Oct. 17, 2013

(30) Foreign Application Priority Data

Dec. 23, 2010 (DE) .................. 10 2010 064 119

(51) Int. Cl.
*G01F 1/66* (2006.01)
(52) U.S. Cl.
CPC ..................................... *G01F 1/662* (2013.01)
USPC ...................................................... 73/861.27
(58) Field of Classification Search
USPC ............. 73/861.27, 861.357, 861.18, 861.28, 73/861.31
See application file for complete search history.

(56) References Cited

U.S. PATENT DOCUMENTS

| 3,727,458 | A |   | 4/1973 | Parkinson |
| 3,964,308 | A |   | 6/1976 | Scarpa |
| 4,365,518 | A | * | 12/1982 | Zacharias, Jr. ............. 73/861.31 |
| 4,823,612 | A |   | 4/1989 | Ichino |
| 5,814,736 | A |   | 9/1998 | Loschberger et al. |
| 5,905,207 | A | * | 5/1999 | Schalk ....................... 73/861.28 |
| 5,962,790 | A |   | 10/1999 | Lynnworth et al. |
| 8,356,523 | B2 | * | 1/2013 | Berger et al. ............. 73/861.357 |
| 8,584,531 | B2 | * | 11/2013 | Liao et al. .................. 73/861.28 |
| 2013/0047743 | A1 | * | 2/2013 | Sonnenberg et al. ....... 73/861.18 |

FOREIGN PATENT DOCUMENTS

| DE |    3941634 A1 | 6/1991 |
| DE | 102006030964 A1 | 1/2008 |

OTHER PUBLICATIONS

German Search Report in corresponding German Application No. 10 2010 064 119.7 dated Sep. 26, 2011.
International Search Report in corresponding International Application No. PCT/EP2011/071467 dated Mar. 22, 2012.
International Preliminary Examination Report in corresponding International Application No. PCT/EP2011/071467 dated Jul. 4, 2013.

* cited by examiner

*Primary Examiner* — Jewel V Thompson
(74) *Attorney, Agent, or Firm* — Bacon & Thomas, PLLC

(57) ABSTRACT

Flow measuring device for ascertaining flow of a measured medium flowing through a measuring tube, which flow measuring device has a first housing for protruding into the measured medium, wherein the first housing has a first surface intended to face the measured medium, wherein the flow measuring device includes a second surface for bounding the measured medium, and wherein each separation between the first surface for bounding the first housing from measured medium, the second surface for bounding the measured medium and the first surface of the first housing amounts to at least 1 mm.

9 Claims, 4 Drawing Sheets

FLOW MEASURING DEVICE

TECHNICAL FIELD

The present invention relates to a flow measuring device for ascertaining the flow of a measured medium flowing through a measuring tube. The flow measuring device has a first housing which protrudes into the measured medium. The first housing has a first surface intended to face the measured medium.

BACKGROUND DISCUSSION

Ultrasonic, flow measuring devices are applied often in process and automation technology. They permit easy determination of volume flow and/or mass flow in a pipeline.

Known ultrasonic, flow measuring devices frequently work according to the Doppler principle or according to the travel-time difference principle. In the travel-time difference principle, the different travel times of ultrasonic pulses are evaluated as a function of flow direction of the liquid. For this, ultrasonic pulses are sent at a certain angle to the tube axis both in, as well as also counter to, the flow direction. From the travel-time difference, the flow velocity, and therewith, in the case of the known diameter of the pipeline cross section, the volume flow, can be determined.

The ultrasonic waves are produced, respectively received, using ultrasonic transducers. For this, ultrasonic transducers are secured in the tube wall of the relevant pipeline section. Another ultrasonic, flow measuring device, which works according to the travel-time difference principle, is known from U.S. Pat. No. 5,052,230. The travel time is, in such case, ascertained by means of short ultrasonic pulses, so-called bursts.

The ultrasonic transducers are normally composed of an electromechanical transducer element, e.g. a piezoelectric element, an ultrasound window, also called a coupling layer, and a housing. The piezoelectric element is composed in industrial process measurements technology usually of a piezoceramic. The ultrasonic waves are produced in the piezoelectric element and led via the ultrasound window into the measured medium. Arranged between the piezoelectric element and the coupling element can be another coupling layer, a so called adapting, or matching, layer. The adapting, or matching, layer performs, in such case, the function of transmitting the ultrasonic signal and simultaneously the reduction of a reflection on interfaces between two materials caused by different acoustic impedances.

More and more, ultrasonic transducers are also being applied for flow measurement of gases. In gases, the transmission of sound energy usable for measuring is essentially smaller than in liquids.

SUMMARY OF THE INVENTION

An object of the invention is to provide a flow measuring device, which is insensitive to tube waves.

The object is achieved by an ultrasonic, flow measuring device for ascertaining the flow of a measured medium flowing through a measuring tube, which flow measuring device, comprises: an ultrasonic transducer; a first housing of said ultrasonic transducer which protrudes into the measured medium, said first housing has a first surface intended to face the measured medium; and a second housing, which has a second surface for limiting the volume of the measured medium, wherein: said first housing is connected with said second housing via a connecting element arranged between said first housing and said second housing; said first housing and said second housing are so arranged relative to one another that a separation between any two points of said first surface and said second surface amounts to at least 0.1 mm, and each separation of said first surface from said second surface measured perpendicular to said first surface amounts to at least 0.5 mm; and each separation of said first surface from said second surface measured perpendicular to said second surface amounts to at least 0.5 mm.

A flow measuring device of the invention for ascertaining flow of a measured medium flowing through a measuring tube includes, for protruding into the measured medium, a first housing of an ultrasonic transducer. The first housing has a first surface intended to face the measured medium. Moreover, the flow measuring device includes a second housing, which has a second surface for limiting the volume of the measured medium. The first housing is connected with the second housing via a connecting element arranged between the first housing and the second housing. The first housing and the second housing are according to the invention so arranged relative to one another that a separation between any two points of the first surface and the second surface amounts to at least 0.2 mm, especially at least 0.5 mm or even at least 1 mm, and that each separation of the first surface from the second surface measured perpendicular to the first surface amounts to at least 1 mm, and that each separation of the first surface from the second surface measured perpendicular to the second surface amounts to at least 1 mm. The respective, perpendicularly measured separations are in an example of an embodiment at least 2 mm. They are measured along a normal vector, thus a surface normal, to the first, respectively second, surface. The separation is measured through the measured medium. In certain configurations, it is also measured through the connecting element.

In a further development of the invention, each separation between any two points of the first surface and the second surface amounts to at least 2 mm, and each separation of the first surface from the second surface measured perpendicular to the first surface amounts to at least 4 mm, and each separation of the first surface from the second surface measured perpendicular to the second surface amounts to likewise at least 4 mm. In an embodiment, the separation of the first surface from the second surface measured perpendicular to the first surface and the separation of the first surface from the second surface measured perpendicular to the second surface are equal. In an additional form of embodiment of the flow measuring device of the invention, each separation between any two points of the first surface and the second surface is at most equally large as the separation of the first surface from the second surface measured perpendicular to the first surface, or as the separation of the first surface from the second surface measured perpendicular to the second surface.

The connecting element can have a third surface bounding the connecting element relative to the measured medium, which third surface of the connecting element assures the predetermined minimum separation of greater than 0.2 mm between first surface and second surface by separating the first surface from the second surface. If a separation normal to the first surface relative to the second surface exists, then this separation amounts to at least 1 mm. If the normals to the first and second surfaces are parallel to one another or intersect at an angle of less than 90°, then the separation between the first surface of the first housing and the second surface of the second housing equals the thickness of the connecting element at the location, where the connecting element contacts the first surface and the second surface. If, for example, the first surface and the second surface form, in each case, a corner with an angle less than or equal to 90° and the corners lie opposite one another, then the separation of the vertices likewise amounts to at least 0.2 mm, especially at least 1 mm.

Referred to as first surface of the first housing is, in such case, the entire surface of the first housing, which in the operating state of the flow measuring device is contacted by the measured medium. Outside of operation, the first surface bounds the first housing relative to the environment. If the first housing is, for example, rotationally symmetric about a longitudinal axis (thus the first housing has an essentially rotationally symmetric cross section around the longitudinal axis of the first housing), thus, the first housing is, for example, cylindrical, then the first surface is composed both of the lateral surface, as well as also of at least one base of the cylindrical first housing, a base which serves e.g. as ultrasound window, to the extent that these surfaces directly contact the measured medium in the operating state of the flow measuring device. The second surface of the second housing is, for example, the measuring tube surface contacting the measured medium or a sensor nozzle surface contacting the measured medium, in the case of a sensor nozzle connected with the measuring tube.

If a liquid phase in the form a drop in an otherwise gaseous, measured medium is considered, then the drop deposits on an area, when the adhesive force between the area and the liquid phase of the measured medium is greater than the cohesive force in the liquid phase of the measured medium, or, in other words, when the wetting surface energy of the liquid phase of the measured medium, which occurs between the liquid phase of the measured medium and the area, is less than the free surface energy of the liquid phase of the measured medium. In such case, the adhesive force depends on the surface perfection, its macro- and microscopic form and size, on the material of the area, on the chemical composition and the thermodynamic state of the measured medium, such as, for example, the density, the partial pressure of the liquid phase and the temperature of the total system of area and measured medium, which influence the size of the surface tension of the drop. If two surfaces are arranged in space, on which a single phase, such as e.g. a drop, can collect, then, supplementally, other parameters are to be taken into consideration, especially their positions and separation in space relative to one another. According to the invention, it is permitted that on the first surface and on the second surface, separately, two mutually separated, liquid phases can deposit, but the surfaces must then be formed and arranged relative to one another such that the two phases do not become so large that they combine. This is prevented by the connecting element arranged between the first and the second surface and the minimum separation of the two surfaces relative to one another. The above recited parameters are thus selected such that the adhesive forces of the first and second surfaces acting together on a single liquid phase of the measured medium is less than the cohesive force in the liquid phase of the measured medium.

A purpose of the embodiment of the invention is to avoid accumulations of moisture, e.g. by capillary effects, between the first surface of the first housing and the second surface. If, for example, the separation between the lateral surface of an at least partially cylindrical first housing and a bore in the measuring tube wall, in which the first housing is emplaced, is small, liquid can collect in the intermediate space formed between these two objects, for example, due to capillary effects. This can in the case of an ultrasonic, flow measuring device, wherein the first housing forms the housing of the ultrasonic transducer, lead to the fact that so called tube waves are transmitted via the liquid accumulation from the measuring tube to the ultrasonic transducer and vice versa.

Known in the state of the art are flow measuring devices, which have ultrasonic transducers inserted into measuring tubes. These have always a predetermined separation from the measuring tubes. Most often, these ultrasonic, flow measuring devices are, however, embodied for measuring liquid measured media, i.e. liquid is always located between the ultrasonic transducers and the measuring tube, via which also tube waves are transmitted. This has only a small influence on the measuring, since the sound energy transmitted in the liquid measured medium and utilized for measuring the flow is, as is known, large in comparison to the energy transmitted analogously in a gas. The ultrasonic, flow measuring device of the invention is, however, specially designed for gas, especially humid gas, e.g. biogas. Moisture accumulation depends on the viscosity of the accumulating moisture, on the surface perfection of the materials, on which moisture collects and not least of all on the materials, especially their affinity, not to drain moisture and therewith to accumulate such, be it water or other liquids. In materials science, discussion is also to the effect that a material is lipophilic, respectively lipophobic, or hydrophilic, respectively hydrophobic, depending on its inclination to hold fats or water.

In a further development of the invention, the ultrasonic, flow measuring device includes a seal arranged as connecting element between the first housing and the second housing and the seal has a thickness of at least 0.1 mm. In an additional further development of the invention, the ultrasonic, flow measuring device includes at least one electromechanical ultrasonic transducer element, and the thickness of the seal amounts to at least $\frac{1}{10}$ of the wavelength $\lambda$ in the seal of the ultrasonic wave emitted by the ultrasonic transducer, at least, however, 0.1 mm.

The seal is suitable for purposes of sealing, however, above all, for acoustic damping of solid-borne sound and therewith lessened transmission of solid-borne sound via the measuring tube to the ultrasonic transducers and/or vice versa. In this regard, the seal is composed of a relatively soft material, for example, an elastomer or Teflon plastic. It has, moreover, a low acoustic impedance of less than 4 MRayl. Its thickness amounts to at least $\frac{1}{10}$ of the wavelength $\lambda$ of the acoustic wave in the seal, which acoustic wave is transmitted from an ultrasonic transducer element of the ultrasonic, flow measuring device. The connecting element in general, or especially the seal as connecting element, has, for example, a thickness greater than 0.2 mm, e.g. at least 0.5 mm. Also, thicknesses, respectively lengths, of the third surface of greater than 1 mm can be provided.

In an additional further development of the invention, the seal has a thickness of at least 2 mm.

The described problem of the accumulation of moisture is present, however, not only in narrow intermediate spaces or capillaries, but, instead, also when two planes intersect to form a corner.

A solution is given by a further development of the invention, according to which the first housing has a first end section, a second end section and a longitudinal axis, wherein the longitudinal axis extends between the first and second end sections, wherein the first housing is embodied, for example, to be sleeve shaped, in which sleeve-shaped first housing there is arranged in the region of the first end section, for example, an ultrasonic transducer element or, for example, a temperature sensing element, wherein each first point of an edge terminating the first surface of the first housing in the region of the second end section of the first housing has a separation from the longitudinal axis of the first housing, which is greater by at least 0.2 mm, especially by at least 0.5 mm, than the separation of all second points of the first surface of the first housing from the longitudinal axis of the first housing, which lie in a shared plane containing the longitudinal axis of the first housing and the first point of the edge and which, in each case, have a separation projected on the longitudinal axis of the first housing from the first point of the edge of at least 0.2 mm, especially at least 0.5 mm, in the direction of the first end section of the first housing.

In an additional further development of the invention, the first housing is so embodied that each longitudinal section of the first surface of the first housing, which lies in a plane with the longitudinal axis of the first housing, is concave in the region of the second end section. In such case, for example, the housing is embodied rotationally symmetrically around its longitudinal axis.

In an additional further development of the invention, the first surface of the first housing has in the region of the second end section relative to the edge terminating the first surface of the first housing a radius of at least 0.2 mm, especially at least 0.5 mm, for example, 1 mm or even 2 mm. The radius is only important, when an accumulation of moisture in a corner would lead to a measurement corruption. In such case, the angle of the corner is replaced by a radius. A degrading can result from the fact that a drop collects in a corner and forms a connection between the first and second surfaces.

The edge of the first housing need not, in such case, be an edge in the narrower sense. It is the curve, which limits the first surface, which bounds the first housing from the measured medium. This curve is, in given cases, determined by the third surface, which borders the first surface, which bounds the first housing from the measured medium. Then, the edge is the curve contacted by the first and third surfaces.

Equally, the second surface is limited by an edge contacted by the second and third surfaces. The second surface can likewise have a radius of at least 0.2 mm, especially at least 0.5 mm, for example, 1 mm or even 2 mm and/or it is concave—the provisions set forth above for the first surface can hold analogously for the second surface.

In an additional further development of the invention, there contacts the first housing at the edge terminating the first surface of the first housing a connecting element, which has a third surface limiting the penetration of the measured medium, wherein the function of the separation of at least one section of a shared section edge of the first surface of the first housing and the third surface of the connecting element in a shared section plane containing the longitudinal axis of the first housing from the longitudinal axis of the first housing, which separation extends at least along, in each case, a subsection of the first housing and of the connecting element, is monotonic, wherein the length of each subsection amounts to at least 0.2 mm, especially 0.5 mm.

Another solution of the problem of accumulation of liquid in corners, according to an additional further development of the invention, is that the first surface of the first housing contacts a third surface of a connecting element limiting penetration of the measured medium, wherein the section edges of the first surface and the third surface in a shared section plane containing the longitudinal axis of the first housing form an angle greater than or equal to 90°.

As above described, the edge forms the termination of the first surface of the first housing, which first surface borders the first housing from the measured medium. At this edge terminating the first surface of the first housing, the first surface contacts the third surface and therewith the first housing contacts the connecting element.

In an additional further development of the invention, the first surface of the first housing comprises a first material and the third surface of the connecting element limiting the measured medium comprises a second material, wherein the first surface of the first housing contacts the third surface of the connecting element, especially at the edge terminating the first surface, wherein the first material is different from the second material. The second surface of the second housing is composed of a third material, which can be the same as the material of the first surface. If the connecting element connects the first housing and the second housing (for example, the measuring tube) with one another, the measuring tube can comprise the same material as the first housing, or it comprises a third material different from the first and/or the second material. The first housing comprises, for example, a metal or a metal alloy, especially stainless steel. The same is true for the second housing. The connecting element comprises then, for example, an elastomer.

In an additional further development of the invention, the measuring tube has at least one necked out portion according to German Patent DE 10 2009 046 886, in which the first housing is emplaced. The inner walls of the necked out portion facing the measured medium comprise the second surface. Naturally, the measuring tube could also have a differently embodied opening, in which the first housing is emplaced.

In an additional further development of the invention, at least the third surface comprises a liquid repelling material, especially a water repelling material. It has, moreover, a contour, which supports the draining of accumulated liquid. The first and/or the second surface can be embodied equally. In order to remove deposits of dirt rapidly and simply, it is known to provide nano-structured surfaces, a key terminology in this regard being lotus effect. In the so-called lotus effect, raised portions rise up to 100 μm high and are spaced up to 200 μm from one another removed. Preferably, raised portions with a maximum height 20 μm are applied. The minimum height amounts to 1 μm. Preferably, raised portions with a height greater than 5 μm are applied. Furthermore, the mutual spacing of the raised portions preferably amounts to up to 50 μm. The minimum mutual spacing of the raised portions amounts to 1 μm, and lies preferably above 5 μm. Such a surface structure is achieved e.g. by a layer of lacquer or paint containing nano-particles or by vapor deposition or spraying on of corresponding particles. Naturally, the nano-particles, in such case, have a size, which does not significantly alter the first and/or second and/or third surfaces in their geometric form. If the first and/or the second surface are/is correspondingly structured, naturally one must distinguish between the macroscopic form of the surfaces and their microscopic form. The separations relative to the second surface or to the first surface are determined macroscopically. The raised portions can be neglected in this regard. They lie rather in the realm of surface roughness. The same is true, of course, for a manufacturing related roughness of the surfaces.

The housing of a flow measuring device of the invention is especially the first housing of an ultrasonic transducer. Especially, the flow measuring device includes at least two ultrasonic transducers, which are arranged so in the measuring tube that the flow of the measured medium through the measuring tube is ascertainable by means of the travel-time difference principle. Involved is, thus, a so called inline, ultrasonic, flow measuring device. Such an inline, ultrasonic, flow measuring device can also have a plurality of pairwise oppositely lying ultrasonic transducers of the invention.

A flow measuring device of the invention is used in a process plant for ascertaining flow of an at least partially gaseous, measured medium, especially for ascertaining flow of a biogas. If the first housing is a housing of an ultrasonic transducer of a flow measuring device, it can further include a damping unit for lessening transmission of solid-borne sound in the first housing, which damping unit has an outer surface, which borders the first housing relative to the environment, thus the outer surface of the damping unit is part of the first surface of the first housing, wherein the function of the separation of each section edge of the outer surface of the damping unit in a section plane, in which a longitudinal axis of the first housing lies, is monotonic relative to the longitudinal axis of the first housing. Further developing this, the first housing includes, moreover, a membrane, which borders the first housing relative to the environment, thus which is likewise part of the first surface, which membrane intersects the longitudinal axis of the first housing, wherein the damping unit has a membrane side, end section and wherein the function of the separation of the section edge of the outer surface of the damping unit in the section plane, in which the longitudinal axis of the first housing lies, grows monotonically relative to the longitudinal axis of the first housing, starting from the membrane side, end section. Further developed, each angle, which the section edge makes with the housing longitudinal axis, is less than 60°. The damping unit includes, for example, at least two coupled mechanical resonators, which are arranged one after the other in the longitudinal direction of the first housing.

BRIEF DESCRIPTION OF THE DRAWINGS

The invention permits numerous forms of embodiment. Some thereof will now be explained in greater detail based on the figures of the appended drawing. Equal elements are provided in the figures with equal reference characters. The figures of the drawing show as follows.

DETAILED DISCUSSION IN CONJUNCTION WITH THE DRAWINGS

Figure 1:
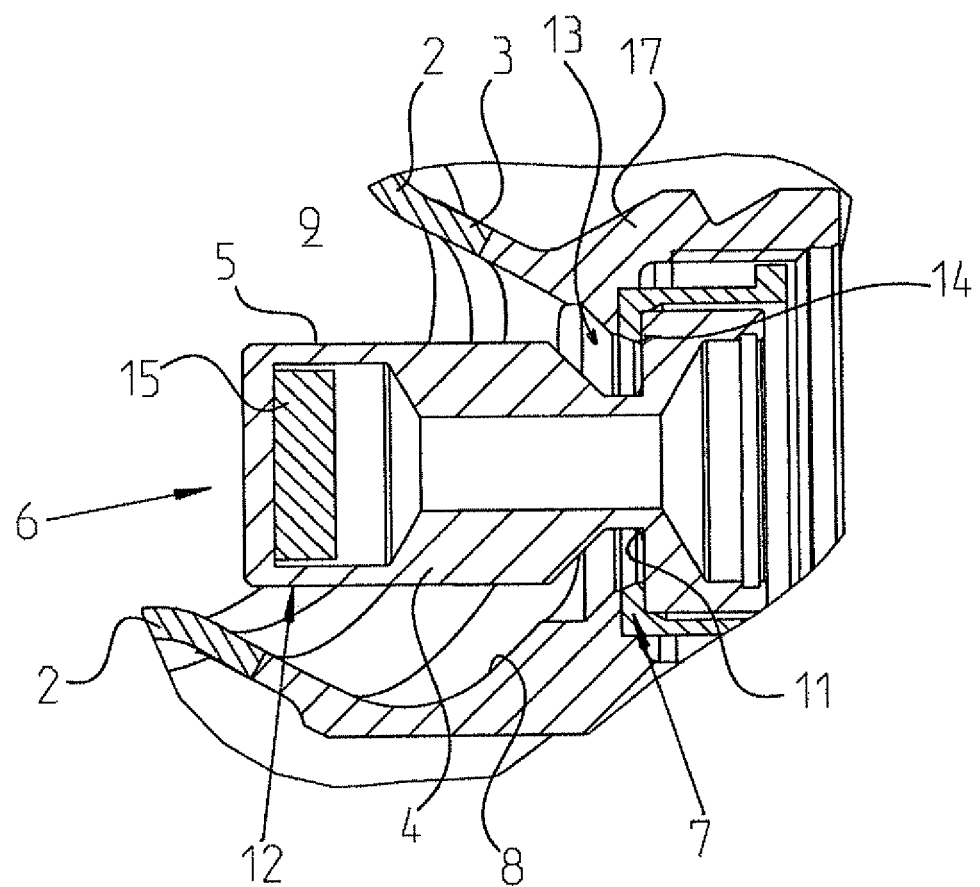
FIG. 1 is a flow measuring device of the invention in a first embodiment, in longitudinal section.

FIG. 1 shows a flow measuring device of the invention 1, in longitudinal section. It includes a measuring tube 2, a necked out portion 3 and a first housing 4 arranged in the necked out portion 3 of the measuring tube 2. First housing 4 is the first housing of the ultrasonic transducer 6. The necked out portion is described in greater detail in the patent application of the assignee bearing application No. DE 10 2009 046 886 (US 2012/0227496 A1). The disclosure of this application relative to necked out portion 3 with a sensor receiving nozzle 17 is incorporated here by reference. Ultrasonic transducer 6 (and therewith the first housing 4) is surrounded in the inner space 9 of the flow measuring device 1 by measured medium.

The first surface 5 of the first housing 4 forms the boundary of the first housing 4 with the measured medium (not shown). At the same time, the first surface 5 of the first housing 4 forms the boundary of the first housing 4 with the inner space 9 of the flow measuring device 1. The first housing is connected with the sensor receiving nozzle 17 via a seal serving as connecting element 7. Sensor receiving nozzle 17 on its part is connected with the remainder of the necked out portion 3 of the measuring tube 2. The surface of the necked out portion 3 and of the measuring tube 2 facing the inner space 9 of the flow measuring device 1 forms a second surface 8, which borders the flow measuring device 1 from the measured medium and the surface of the connecting element 7 facing the inner space 9 of the flow measuring device 1 forms a third surface.

The separation of the first surface 5 from itself and from the second surface 8 amounts always to at least 1 mm. In this way, no liquid collects between the first surface 5 and the second surface 8 and between surface portions of the first surface 5. This improves the signal to noise ratio for the ultrasonic transducer 6, since no tube waves can be transmitted, via an accumulation of liquid, from the measuring tube 2 to the first housing 4 of the ultrasonic transducer 6. The described flow measuring device 1 is mainly applied for flow measurement of gas, especially biogas.

In the case of this example of an embodiment, the first housing 4 is rotationally symmetric around the longitudinal axis 10. It has a radius 11 of typically 0.5 mm in the region a second end section 13 of the first housing 4. The first housing 4 has no narrow notch or undercut, not even a 90° angle. In this way, moisture accumulation is prevented. A recess 18 serves to provide a free space of the invention between the first and second surfaces 5 and 9. If, for example, moisture in the form a drop would collect on the first surface 5 in the region of the radius 11, without drops supplementally contacting the second surface 8 and wetting such, this accumulation of moisture would not lead to degradation of the measuring. The radius 11 is here, however, so embodied that no drops connecting and thus bridging the first and second surfaces can accumulate.

In a first end section 12, an ultrasonic transducer element 15 is arranged. In the region of the second end section 13 is located an edge 14 terminating the first surface 5 of the first housing 4. Edge 14, respectively a section edge, is here defined by the presence of the seal as connecting element 7 on the first surface 5.

Figure 2:
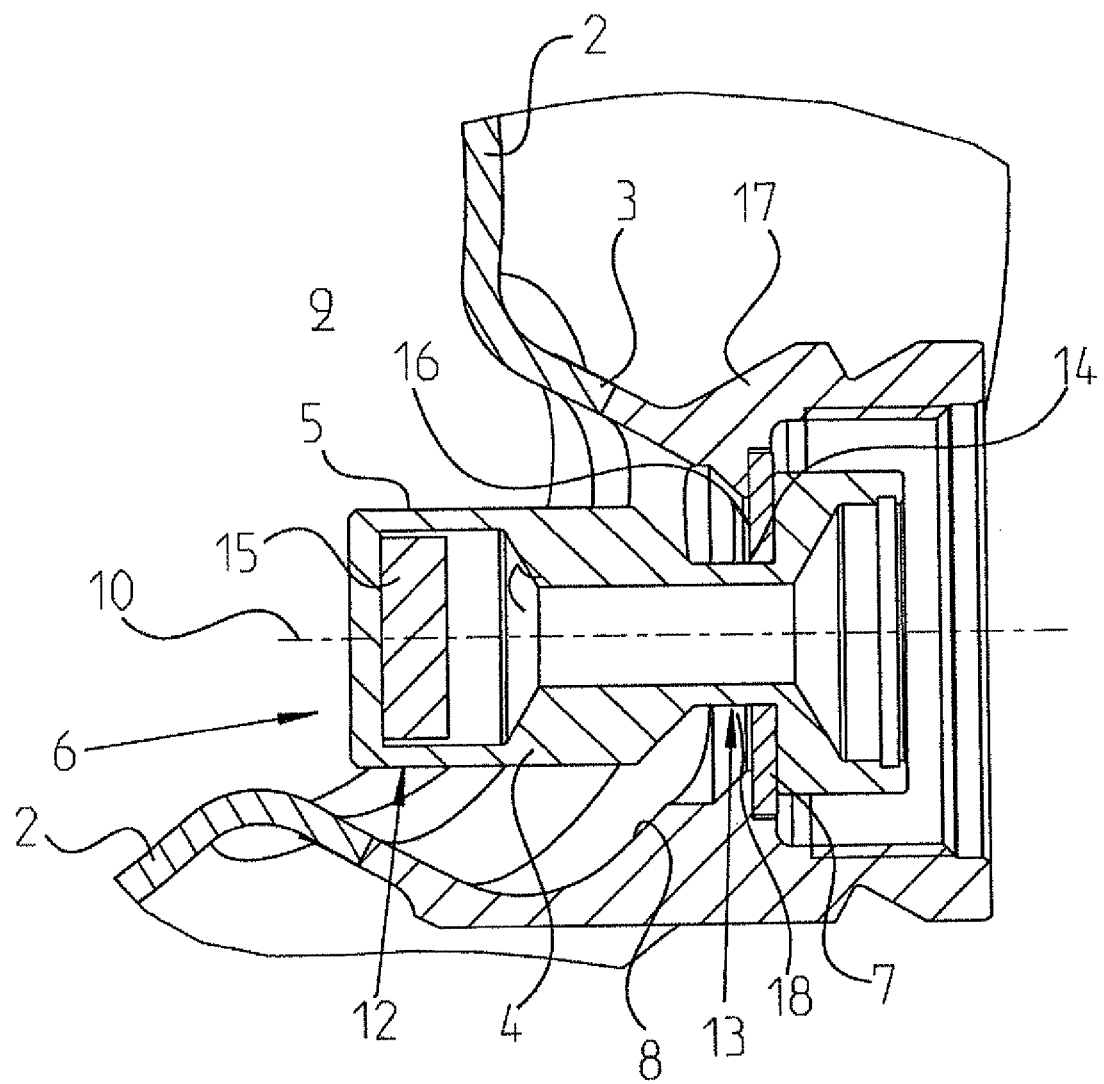
FIG. 2 is a flow measuring device of the invention in a second embodiment, in longitudinal section.

FIG. 2 shows another embodiment of a flow measuring device 1 of the invention in longitudinal section. The difference compared with the previously described embodiment is mainly that the first surface 5 of the first housing 4 forms in the region of its second end section 13 an angle 16 of 90° with the third surface of the connecting element 7 in a shared section plane containing the longitudinal axis 10 of the first housing 4. In such case, the first surface 5 of the first housing 4 comprises a first material and the third surface of the connecting element 7 comprises a second material, wherein the first material is different from the second material. Through intelligent selection of the materials, an accumulation of moisture in the angle 16 can be avoided, which can likewise wet the second surface 8. Not only the material of the seal is correspondingly selected, for example, in the form of an elastomer, but also its surface perfection. The shown seal 7 lies against the first surface 5 of the housing 4. Depending on tolerance, also a smaller gap can form between the seal 7 and the housing 4, which, in given cases, fills with liquid. This has, however, no effect on the measuring, so long as no ultrasonic waves are transmitted through the liquid from the first surface 5 to the second surface 8. The seal 7 has in this example a thickness parallel to the longitudinal axis of the ultrasonic transducer housing 4 of at least 0.1 mm for preventing moisture accumulation and of at least $\lambda/10$ of the ultrasonic wave in the seal for acoustic damping. Both contribute to the robustness of the ultrasonic, flow measuring device, in that the influence of tube waves is lessened.

Figure 3:
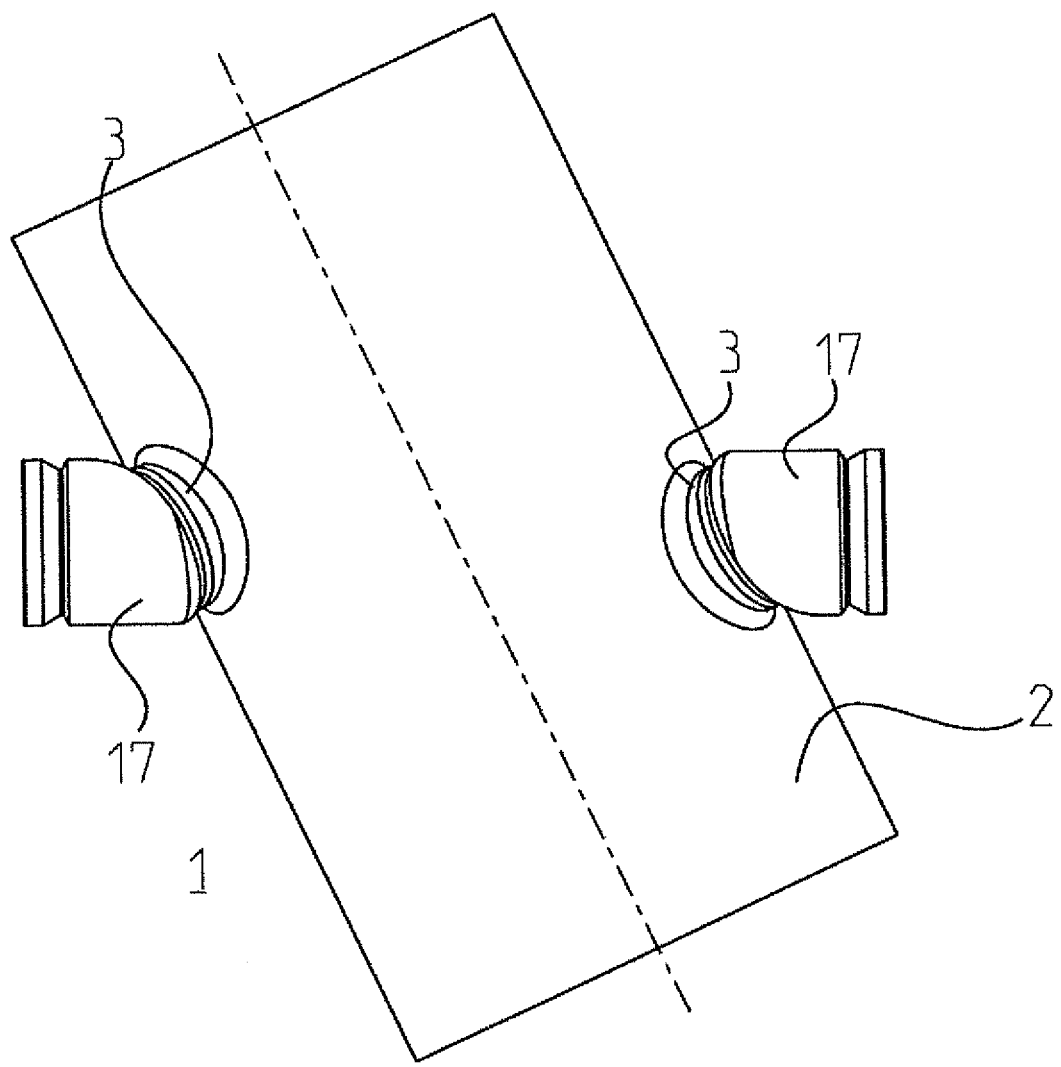
FIG. 3 is an unsectioned view of the exterior of a flow measuring device of the invention.
Figure 4:
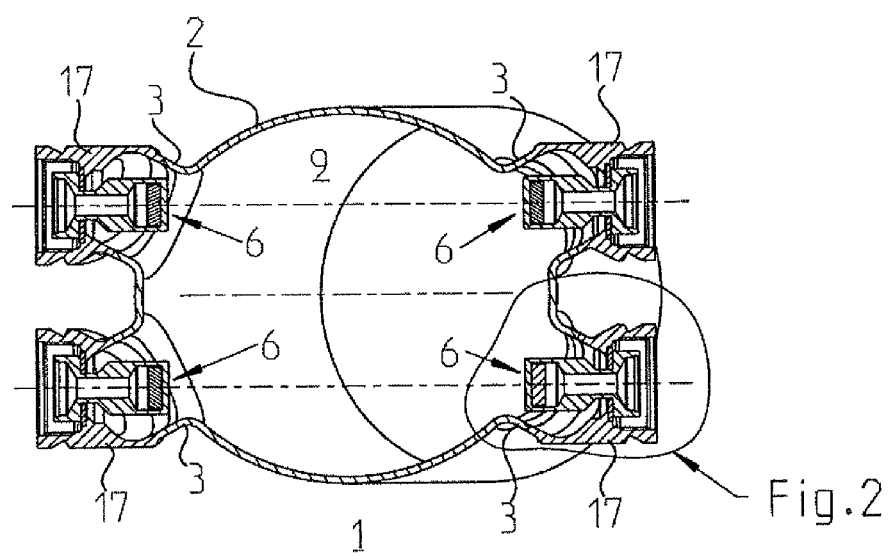
FIG. 4 is a flow measuring device of the invention, in section.

FIG. 3 shows a flow measuring device of the invention 1 in plan view. The indicated section is shown in FIG. 4. The section extends perpendicularly on the measuring paths between the individual ultrasonic transducers 6 of the flow measuring device 1, which are pairwise opposite one another.

The invention claimed is:

1. An ultrasonic, flow measuring device for ascertaining the flow of a measured medium flowing through a measuring tube, which flow measuring device, comprises:
    an ultrasonic transducer;
    a first housing of said ultrasonic transducer which protrudes into the measured medium, said first housing has a first surface intended to face the measured medium; and
    a second housing, which has a second surface for limiting the volume of the measured medium, wherein:
    said first housing is connected with said second housing via a connecting element arranged between said first housing and said second housing;
    said first housing and said second housing are so arranged relative to one another that a separation between any two points of said first surface and said second surface amounts to at least 0.1 mm, and each separation of said first surface from said second surface measured perpendicular to said first surface amounts to at least 0.5 mm; and
    each separation of said first surface from said second surface measured perpendicular to said second surface amounts to at least 0.5 mm.

2. The ultrasonic, flow measuring device as claimed in claim 1, wherein:
    each separation between any two points of said first surface and said second surface amounts to at least 2 mm, and each separation of said first surface from said second surface measured perpendicular to said first surface amounts to at least 4 mm; and
    each separation of said first surface from said second surface measured perpendicular to said second surface amounts to at least 4 mm.

3. The ultrasonic, flow measuring device as claimed in claim 1, wherein:
    a seal is arranged as said connecting element between said first housing and said second housing; and
    said seal has a thickness of at least 0.1 mm.

4. The ultrasonic, flow measuring device as claimed in claim 3, wherein:
    said seal has a thickness of at least 2 mm.

5. The ultrasonic, flow measuring device as claimed in claim 1, wherein:
    said first surface of said first housing comprises a first material and a third surface of said connecting element limiting the measured medium comprises a second material;
    said first surface of said first housing contacts said third surface of said connecting element; and
    the first material is different from the second material.

6. The ultrasonic, flow measuring device as claimed in claim 1, wherein:
    said first housing has an essentially rotationally symmetric cross section around the longitudinal axis of said first housing.

7. The ultrasonic, flow measuring device as claimed in claim 1, wherein:
    the measuring tube has at least one necked out portion, in which said first housing is emplaced.

8. The ultrasonic, flow measuring device as claimed in claim 1, further comprises:
    at least a first ultrasonic transducer, which has said first housing; and
    a second ultrasonic transducer, wherein:
    the ultrasonic transducers are so arranged in the measuring tube that the flow of the measured medium through the measuring tube is ascertainable by means of the travel time difference principle.

9. The use of an ultrasonic, flow measuring device for ascertaining the flow of a measured medium flowing through a measuring tube, which flow measuring device, comprises: an ultrasonic transducer; a first housing of said ultrasonic transducer which protrudes into the measured medium, said first housing has a first surface intended to face the measured medium; and a second housing, which has a second surface for limiting the volume of the measured medium, wherein: said first housing is connected with said second housing via a connecting element arranged between said first housing and said second housing; said first housing and said second housing are so arranged relative to one another that a separation between any two points of said first surface and said second surface amounts to at least 0.1 mm, and each separation of said first surface from said second surface measured perpendicular to said first surface amounts to at least 0.5 mm; and each separation of said first surface from said second surface measured perpendicular to said second surface amounts to at least 0.5 mm, wherein:
    the flow measuring device is applied in a process plant for ascertaining flow of an at least partially gaseous, measured medium, especially for ascertaining flow of biogas.

\* \* \* \* \*